United States Patent [19]

Masumi et al.

[11] Patent Number: 5,037,607

[45] Date of Patent: Aug. 6, 1991

[54] REACTOR

[75] Inventors: Ryoji Masumi, Ishioka; Kunitoshi Kurihara, Katsuta; Masayoshi Ishida, Ibaraki, all of Japan

[73] Assignee: Hitachi, Ltd., Tokyo, Japan

[21] Appl. No.: 354,780

[22] Filed: May 22, 1989

[30] Foreign Application Priority Data

May 25, 1988 [JP] Japan ................. 63-125773

[51] Int. Cl.⁵ ............................................. G21C 3/32
[52] U.S. Cl. .................................. 376/434; 376/435; 376/448; 376/428
[58] Field of Search ................. 376/435, 428, 434, 448

[56] References Cited

U.S. PATENT DOCUMENTS

| | | | |
|---|---|---|---|
| 3,702,803 | 11/1972 | Huebotter | |
| 4,011,133 | 3/1977 | Bloom | 176/68 |
| 4,158,606 | 6/1979 | Bloom | 176/87 |
| 4,587,091 | 5/1986 | Watari | 376/434 |

FOREIGN PATENT DOCUMENTS

| | | |
|---|---|---|
| 2134104 | 12/1972 | France . |
| 2503917 | 10/1982 | France . |
| 57-166591 | 10/1982 | Japan . |

OTHER PUBLICATIONS

Broomfield, A. M., Journal of the British Nuclear Energy Society, Apr. 25, 1986, pp. 73–84, No. 2.
Michel et al., RGN-Revue Générale Nucléaire, May–Jun., 1987, No. 3, Paris, France.

Primary Examiner—Brooks H. Hunt
Assistant Examiner—Meena Chelliah
Attorney, Agent, or Firm—Antonelli, Terry, Stout & Kraus

[57] ABSTRACT

The present invention provides a structural component for constituting a reactor core comprising one and the other metallic members arranged adjacent to each other in a reactor, and reduction means for reducing a difference in the swelling between the metallic members due to neutron irradiation thereto; a core of the reactor comprising a plurality of such constructural element; and a method for operating a reactor having metallic tubular members arranged in a core of the reactor and each enclosing a plurality of metallic cladding tubes in each of which substance heated by neutron irradiation thereto and cooled by passing coolant through the reactor core is filled, wherein the reactor is operated under a condition that an average used temperature of the cladding tubes is higher than an irradiation temperature that the swelling rate of the cladding material due to neutron irradiation thereto becomes maximum and an average used temperature of the tubular members is lower than an irradiation temperature that the swelling rate of the tubular material due to neutron irradiation thereto becomes maximum. According to the structural component and the reactor core, since the difference in the swelling between the metallic members due to neutron irradiation thereto can be decreased, any mechanical interactions can be prevented or reduced. According to the present method, since the difference in the swelling between the metallic members due to neutron irradiation thereto can be decreased due to the above operation temperature condition, any mechanical interactions can be prevented or reduced.

20 Claims, 9 Drawing Sheets

REACTOR

BACKGROUND OF THE INVENTION

The present invention relates to fast breeder reactors, and more particularly, it relates to structural components for constituting a reactor core, a core of reactor constituted by such components, and a method for operating such reactor.

In general, a core of a fast breeder reactor is formed by bundling a plurality of fuel assemblies each comprising a bundle of cladding tubes in which fuel pellets are filled respectively and each enclosed by a hexagonal duct, to provide a coolant flow channel. Further, in such reactor core, the breeding of the fuel is improved by enclosing the core by axial and radial blankets of fertile material. The fuel such as enriched uranium or plutonium added uranium is mounted in the core, and the fertile material such as natural uranium or depleted uranium is mounted in the blankets. When the fertile material captures fast neutrons having high energy escaped from the core, useful fissile materials are produced. At the same time, the fast neutrons are absorbed in the members constituting the reactor core such as the cladding tubes and ducts, thus expelling atoms from such members and/or nuclear-reacting with impurity to create bubbles of helium gas, thereby swelling the material of such members. The life of the fuel in the fast breeder reactor is often limited by bundle-duct interaction (BDI) between the fuel bundle and the corresponding duct and/or duct-duct interaction (DDI) between the adjacent ducts, due to the swelling of material of the core constituting members. Similarly, in some cases, the life of a control rod which forms a part of the structural component constituting the reactor core is limited by the interaction between the absorber rod bundle and the corresponding duct.

The degree of the swelling of the core constituting members depends upon fast neutron fluence and/or irradiation temperature with respect to the fuel assemblies. FIG. 4 shows the axial distribution of these features (i.e., the fast neutron fluence and irradiation temperature) with respect to the fuel assembly in which the fast neutron fluence of the core in a homogeneous core of electrical rating of 1,000 MW is maximum. As apparent from FIG. 4, in the vicinity of the axial center of the reactor core where the fast neutron fluence is maximum, a cladding temperature differs from a duct temperature by about 100° C. In the conventional design of the fast breeder reactors, in many cases, the cladding tubes were made of the same material as the ducts. With such construction, the BDI or DDI will occur owing to the difference in the swelling rates between the cladding tubes and ducts due to the difference in the irradiation temperatures between the cladding tubes and the ducts. That is to say, when the temperature at which the swelling rate of the material becomes peak or maximum (i.e., the peak swelling temperature) is in the vicinity of the range of the irradiation temperature of the cladding tube (cladding temperature), the BDI will occur since the swelling of the cladding is larger than that of the duct whose temperature is lower than the cladding. On the other hand, when the peak swelling temperature of the material is in the vicinity of the range of the irradiation temperature of the duct (duct temperature), the BDI will not occur since the swelling of the duct is larger than that of the cladding. But in this latter case, the DDI will occur.

In order to reduce the BDI, an improved fuel assembly comprising cladding tubes made of material having relatively small swelling rate and ducts made of material having relatively large swelling rate has been proposed, as disclosed in the Japanese Patent Laid-open No. 57-166591.

With such conventional fuel assembly, the BDI can be reduced or prevented since the swelling of the cladding is smaller than that of the duct. However, in such conventional fuel assembly, since the reduction regarding the swelling of the duct is not devised, when the fuel life is limited by the occurrence of the DDI, it is not expected that the fuel life is extended or increased.

SUMMARY OF THE INVENTION

A first object of the present invention is to provide structural components for constituting a reactor core, which can reduce both bundle-duct interaction (BDI) and duct-duct interaction (DDI) simultaneously.

A second object of the present invention is to provide a core of reactor constituted by such components, which can reduce both the bundle-duct interaction and the duct-duct interaction simultaneously.

A third object of the present invention is to provide a method for operating such reactor, which can reduce both the bundle-duct interaction and the duct-duct interaction simultaneously.

According to the present invention, in order to achieve the above-mentioned first object, there are provided structural components for constituting a reactor core, comprising one and the other metallic members arranged adjacent to each other in a reactor, and means for relatively reducing the swelling of both of the metallic members due to neutron irradiation thereto.

According to the present invention, in order to achieve the above:-mentioned second object, there is provided a core of reactor constituted by such structural components, in which a plurality of structural components each comprising one and the other metallic members arranged adjacent to each other in the reactor and means for relatively reducing the swelling of both of the metallic members due to neutron irradiation thereto are mounted.

According to the present invention, in order to achieve the above-mentioned third object, there is provided a method for operating a reactor having a plurality of metallic tubular members arranged in a core of the reactor and each enclosing a plurality of metallic cladding tubes in each of which substance capable of being heated by neutron irradiation and being cooled by passing coolant through the reactor core is filled, wherein the reactor is operated under the condition that an average used temperature of the cladding tubes is higher than an irradiation temperature that the swelling rate of the cladding material due to neutron irradiation thereto becomes maximum and an average used temperature of the tubular members is lower than an irradiation temperature that the swelling rate of the tubular material due to neutron irradiation thereto becomes maximum.

DESCRIPTION OF PREFERRED EMBODIMENTS

Figure 2:
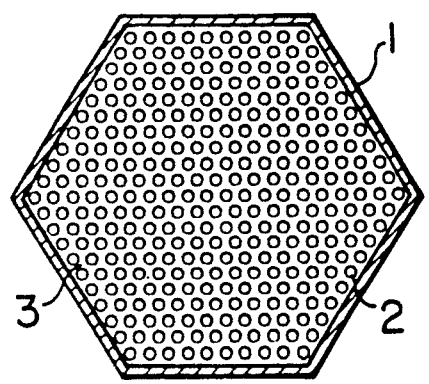
FIG. 2 is an enlarged sectional view taken along the line II—II of FIG. 1.
Figure 1:
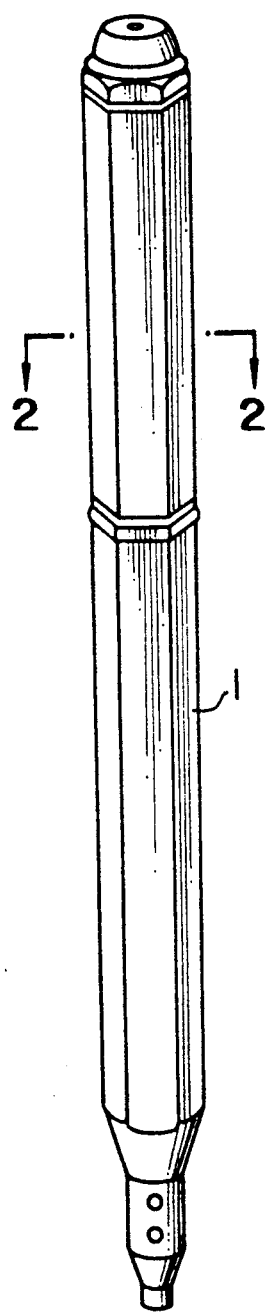
FIG. 1 is a perspective view of a fuel assembly used with a fast breeder reactor according to the present invention.
Figure 3:
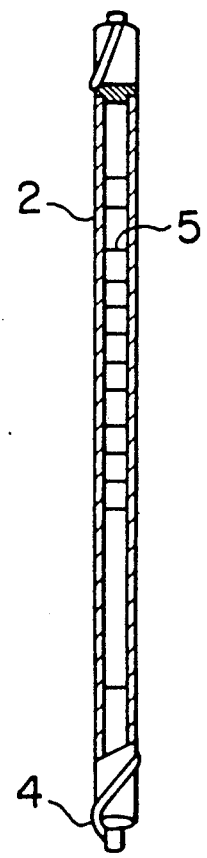
FIG. 3 is an enlarged plan view, in partial section, of a fuel element used in the fuel assembly of FIGS. 1 and 2.

A core of a fast breeder reactor is constituted by assembling a plurality of fuel assemblies and control rods together. FIGS. 1 to 3 show an embodiment of the present invention, where the present invention is applied to such fuel assemblies of the fast breeder reactor core.

The fuel assembly of the fast breeder reactor comprises a bundle of cladding tubes 2 each made of titanium added cold worked 316SS material (cold worked 316SS-Ti) and in each of which a fuel pellet 5 comprising mixed oxide of uranium and plutonium is filled, and a duct 1 made of cold worked AISI316 material for enclosing the bundle of the cladding tubes. Incidentally, the reference numeral 3 designates coolant, and 4 designates a wire spacer.

Figure 14:
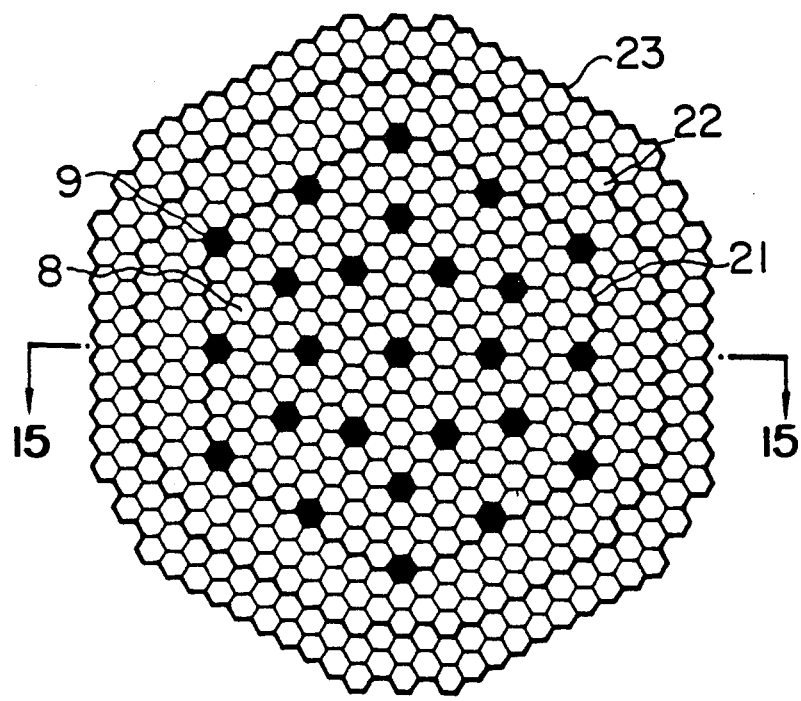
FIG. 14 is a horizontal sectional view of a core of a fast breeder reactor according to further embodiment of the present invention.
Figure 15:
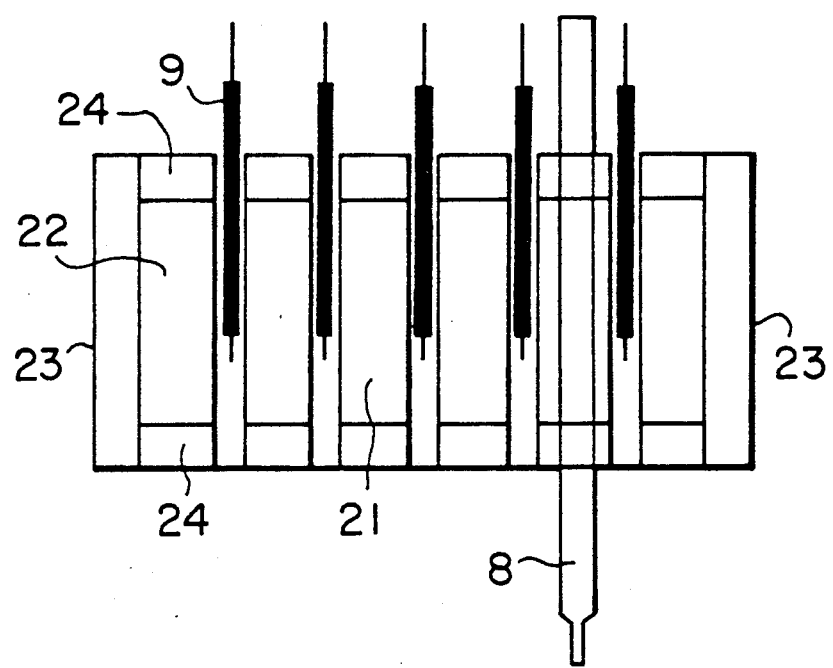
FIG. 15 is a sectional view taken along the line XV—XV of FIG. 14.

The effect of the illustrated embodiment was appreciated or appraised on the basis of an example that the above-mentioned fuel assembly was applied to a core of a fast breeder reactor shown in FIGS. 14 and 15. Specification and operating condition of the reactor core and the fuel material are shown in the following table 1. That is to say, thermal rating of the reactor is about 2,600 MW, electrical rating is about 1,000 MW, equivalent core diameter and core height are 330 cm and 100 cm, respectively. Thickness of an axial blanket is 35 cm and thickness of a radial blanket is 30 cm. The operating cycle length is twelve months, and batch factor is three in the core and four in the radial blanket. As to the composition of the fuel material, enrichment of plutonium is about 16% in an inner core 21 and about 20% in an outer core 22.

TABLE 1

| Specification of Reactor Core and Fuel | | |
|---|---|---|
| Items | | Specification |
| Thermal rating | MW | about 2,600 |
| Electrical rating | MW | about 1,000 |
| Operating cycle length | Days | 365 |
| Batch factor core/radial blanket | | ¾ |
| Reactor inlet/outlet temperature | °C. | 510/355 |
| Average discharged burnup | GWd/t | 90 |
| Core diameter/core height | cm | 330/100 |
| Blanket thickness radial/axial | cm | 30/35 |
| Number of fuel subassemblies core fuel/radial blanket | | 354/150 |
| Volume fraction (fuel/coolant/structure) | % | |
| core, axial blanket | | 41/36/23 |
| radial blanket | | 51/30/19 |
| Fuel material | | |
| inner core fuel | | 16% PuO$_2$-depleted UO$_2$ |
| outer core fuel | | 20% PuO$_2$-depleted UO$_2$ |
| blanket | | depleted UO$_2$ |
| Fuel smear density core/blanket | % TD | 87/90 |
| Cladding material | | cold worked 316SS-Ti |
| Duct material | | cold worked AISI316 |
| Coolant material | | Na |
| Fuel pin inner/outer diameter | cm | 0.67/0.75 |
| Number of pins per subassembly | | 271 |
| Spacer wire diameter | cm | 0.13 |
| Duct thickness | cm | 0.4 |
| Distance between duct inner surfaces | cm | 14.8 |
| Subassembly lattice pitch | cm | 16.2 |

Figure 4:
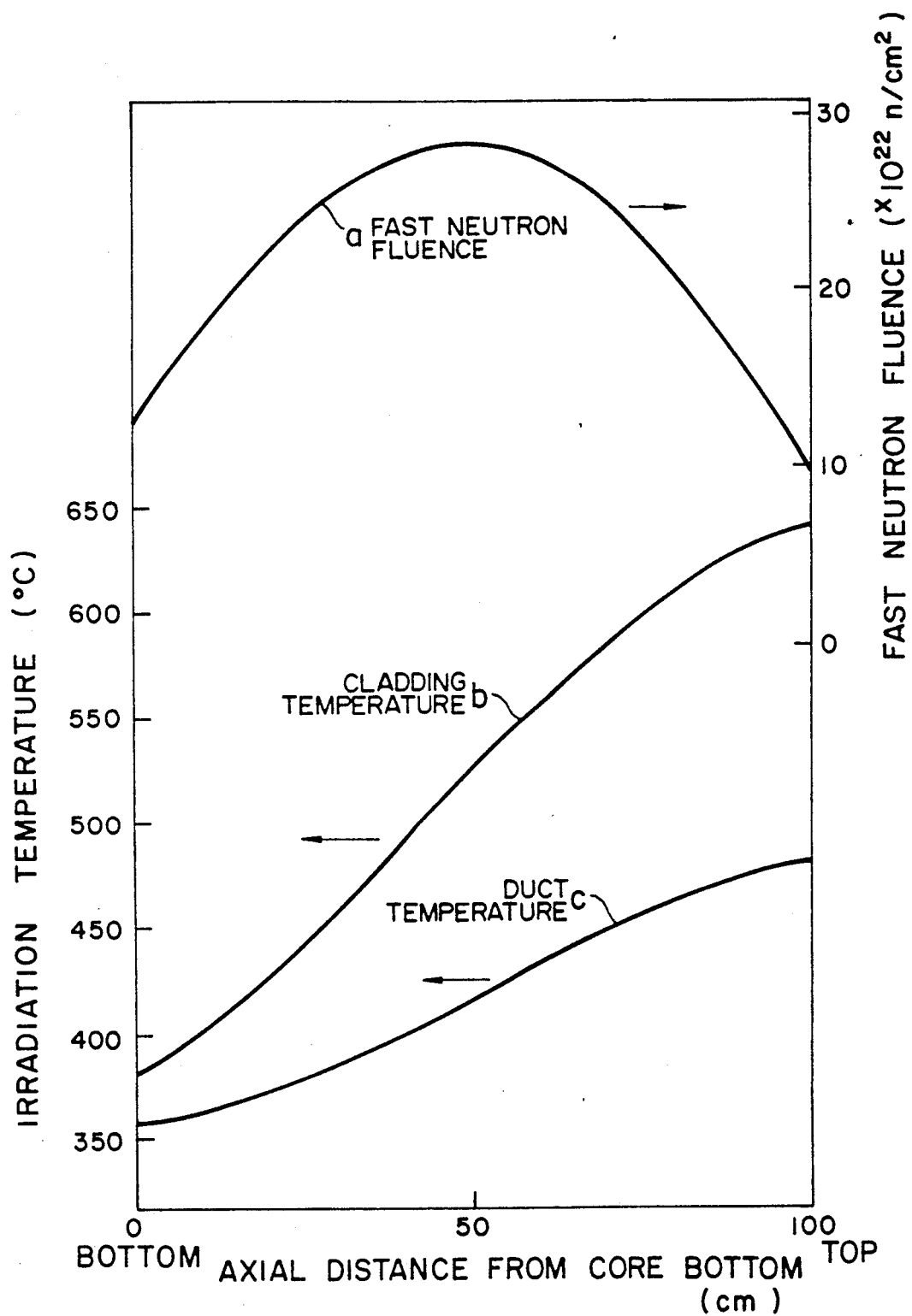
FIG. 4 is a graph showing the axial distribution of fast neutron fluence and the irradiation temperature of the fuel assembly used with the fast breeder reactor according to the present invention.
Figure 5:
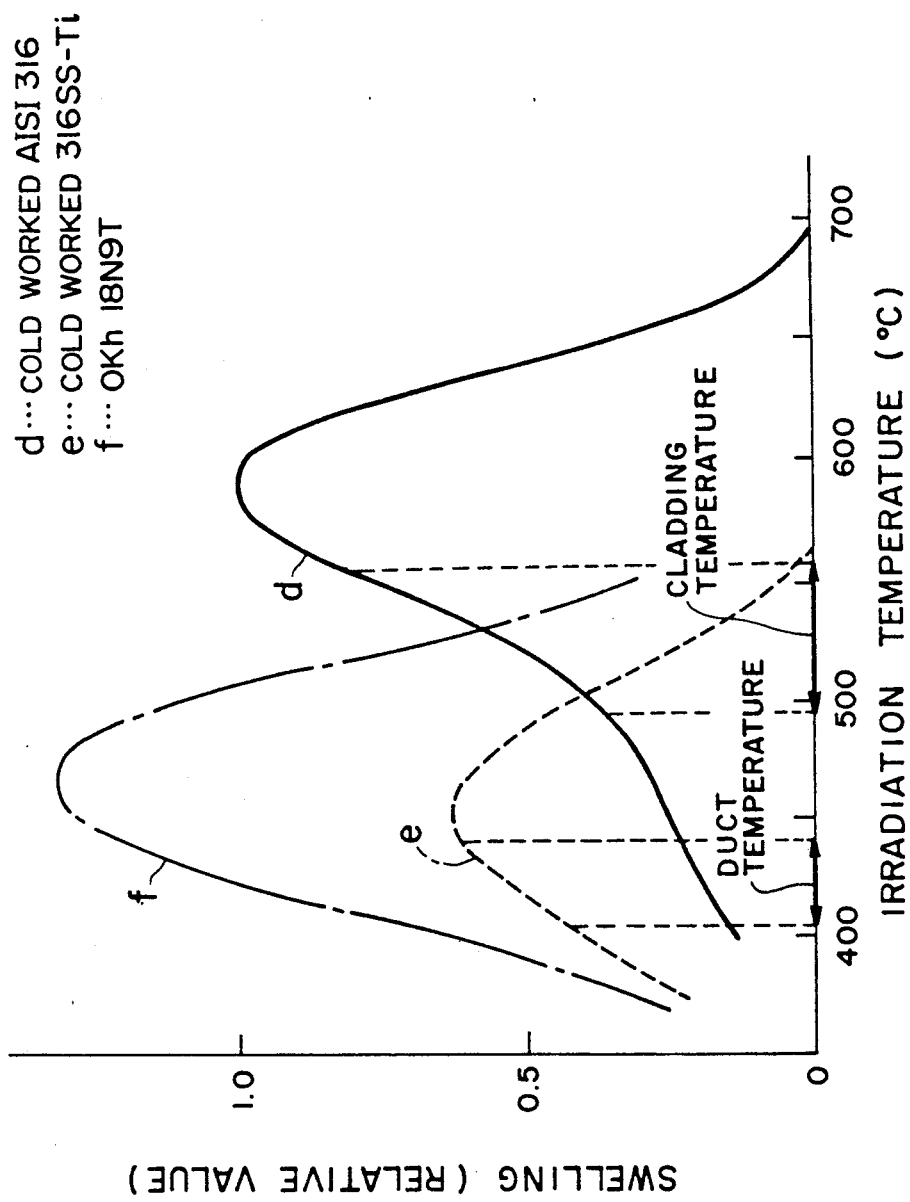
FIG. 5 is a graph showing the swelling rate of material used in an embodiment of the present invention.

FIG. 4 shows the axial distribution of fast neutron fluence and the average used temperature of a fuel assembly having the maximum fast neutron fluence during staying in the reactor core, among the fuel assemblies according to a first embodiment of the present invention. In FIG. 4, a curve a shows the fast neutron fluence, curve b shows a cladding temperature, and curve c shows a duct temperature. In the core of the fast breeder reactor, since leakage of the neutrons is large in upper and lower ends of the reactor core, the fast neutron fluence becomes maximum in the vicinity of an axial center of the reactor core, as can be understood from the curve a. As seen from FIG. 4, the temperature of the material in the vicinity of the axial center of the reactor core is about 530° C. or around, with respect to the cladding tube 2, as can be understood from the curve b, and is about 420° C. or around, with respect to the duct 1, as can be understood from the curve c. On the other hand, the temperature dependence of the swelling of the material is as shown in FIG. 5 for a given fast neutron fluence That is to say, in FIG. 5, a curve d shows the swelling of cold worked AISI316 material, curve e shows the swelling of cold worked 316SS-Ti material, and curve f shows the swelling of OKh 18N9T material. In the cold worked AISI316 material constituting the duct 1, as seen from the curve d, the peak swelling corresponds to a temperature of about 580° C., and the swelling rate is suddenly decreased below such temperature. In the cold worked 316SS-Ti material constituting the cladding tube 2, as seen from the curve e, the peak swelling corresponds to a temperature of about 450° C., and the swelling rate is suddenly decreased above such temperature. In the illustrated embodiment, by using such temperature dependence of the swelling rate of the material, the cladding tubes 2 having the used temperature of about 530° C. or around are made of the cold worked 316SS-Ti material, and the ducts 1 having the used temperature of about 420° C. or around are made of the cold worked AISI316 material. With this construction, in comparison with the case where both cladding tubes and ducts are made of the cold worked AISI316 material, the maximum value of the swelling of the cladding tubes can be reduced to about ½, and the BDI can also be reduced to about ½. Further, in comparison with the case where both cladding tubes and ducts are made of the cold worked 316SS-Ti material, the maximum value of the swelling of the ducts can be reduced to about ½, and the occurrence of the DDI can be prevented. Further, in comparison with the case where the cladding tubes are made of the 316SS-Ti material having relatively small swelling rate and the ducts are made of OKh 18N9T material having relatively large swelling rate as disclosed in the Japanese Patent Laid-open No. 57-166591, the swelling of the ducts can be reduced to about ½. Accordingly, since the permissible fast neutron fluence can be increased by about 20% or more if the upper limit of the swelling is registered with the upper limit of the swelling of the conventional reactor, the life of the fuel assembly can be prolonged accordingly.

In this way, according to the present invention, the cladding tubes are made of material having the different temperature dependence of the swelling rate from that of the material constituting the ducts, in consideration of the difference in the used temperature between the cladding tubes and the ducts. More particularly, the cladding tubes having the relatively high used temperature are made of material which has a low temperature when the maximum swelling is reached (referred to as "low temperature peak swelling material" hereinafter), and the ducts having the relatively low used temperature are made of material which has a high temperature when the maximum swelling is reached (referred to as "high temperature peak swelling material" hereinafter). With the cladding material including titanium as stabilized element, creep strength of the cladding tube can be increased.

With such fuel assembly according to the first embodiment, since the BDI and DDI can be reduced simultaneously, the life of the fuel assembly can be prolonged, and accordingly, the operating or running cost of the reactor can be reduced.

Figure 6:
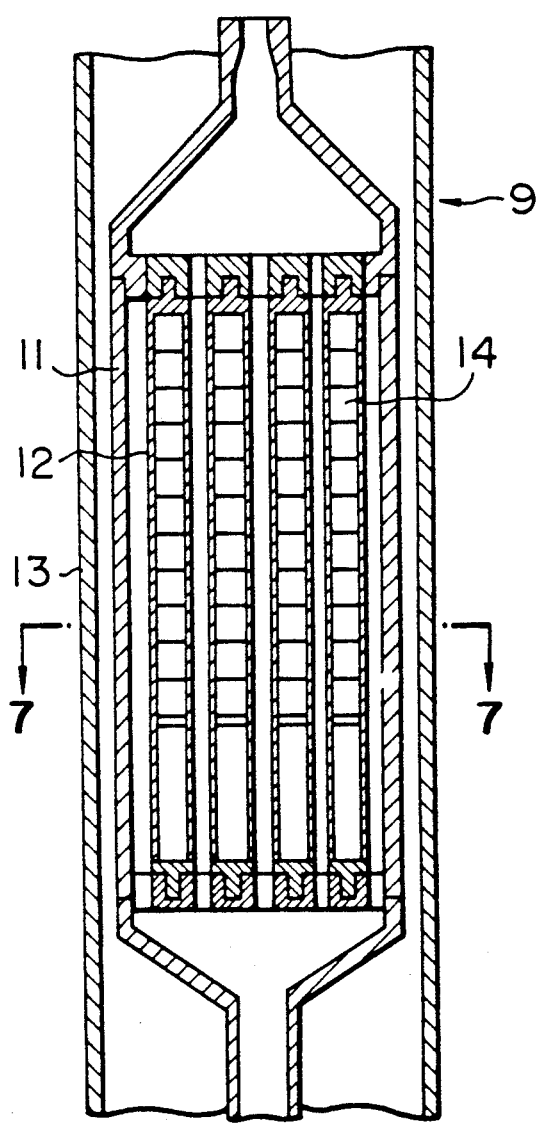
FIG. 6 is a vertical sectional view of a control rod of the fast breeder reactor according to the present invention.
Figure 7:
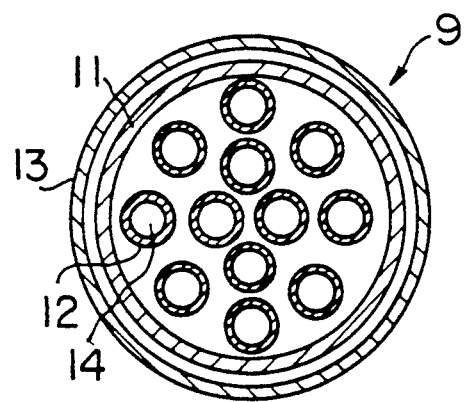
FIG. 7 is a sectional view of the control rod taken along the line VII—VII of FIG. 6.

FIGS. 6 and 7 show a second embodiment of the present invention, where the present invention is applied to control rods 9 of a fast breeder reactor. FIG. 6 shows a vertical section of the control rod 9, and FIG. 7 is a sectional view taken along the line VII—VII of FIG. 6. The control rod 9 is constituted by a bundle of cladding tubes 12 covered by a guard tube 11 of the cold worked AISI316 and each made of the cold worked 316SS-Ti and in each of which a neutron absorbing pellet 14 made of boron carbide ($B_4C$) is filled. The temperature distribution of the control rod is substantially the same as that of fuel assembly, since the neutron absorbing pellet 14 is heated by the neutron irradiation. Accordingly, with such arrangement, in comparison with the conventional case where the cladding tubes 12 and the guard tube 11 are made of the same material, mechanical interaction (bundle-tube interaction) between the cladding tubes 12 and the guard tube 11 can be further reduced, thus increasing the life of the control rod. Further, since a gap can be maintained between the guard tube 11 and a guide tube 13 arranged around the protection tube, the insertion ability of the control rod with respect to the reactor core can be improved or maintained for a long time, thus providing safety operation. Further, in a reactor where the guard tube 11 becomes relatively high temperature and the guide tube 13 is relatively low temperature, by using the low temperature peak swelling material such as the cold worked 316SS-Ti for the guard tube 11 and using the high temperature peak swelling material such as the cold worked AISI316 for the guide tube 13, the insertion ability of the control rod can be improved.

Figure 8:
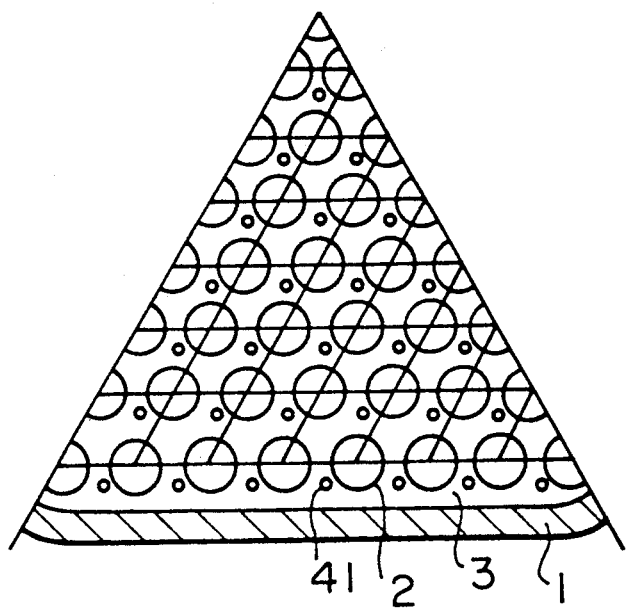
FIGS. 8, 9, 10, 11, 12 and 13 are horizontal sectional views each showing a fuel assembly, in its sixth portion, used with a fast breeder reactor according to other embodiment of the present invention.
Figure 9:
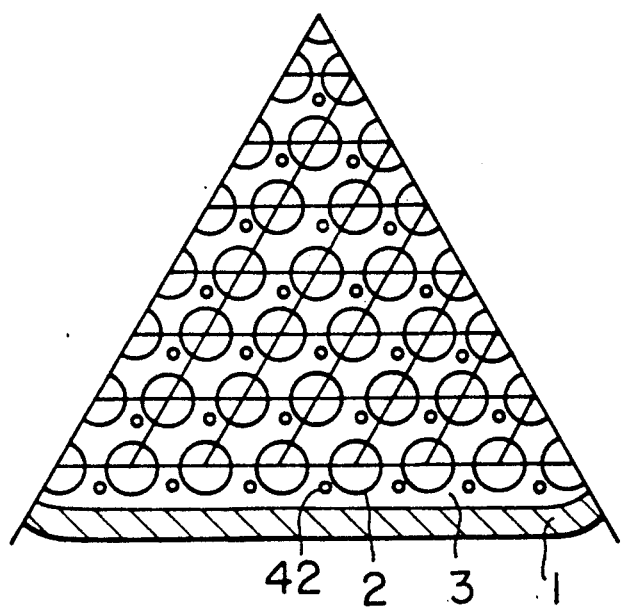
Figure 10:
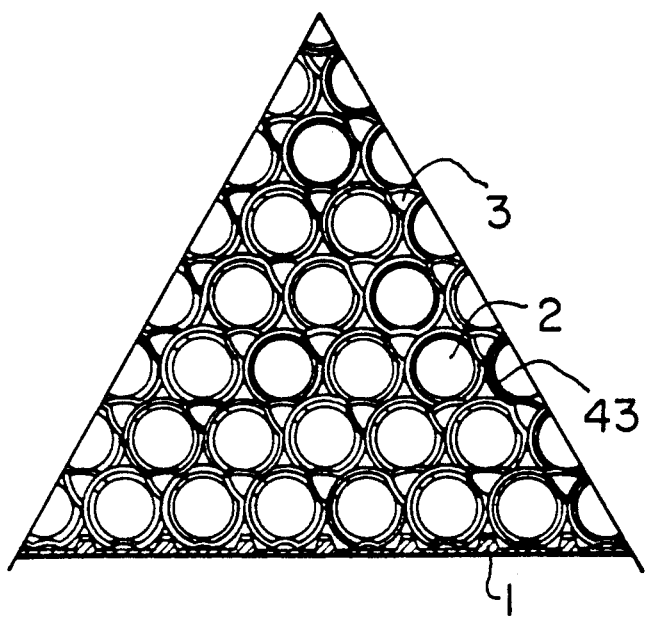
Figure 11:
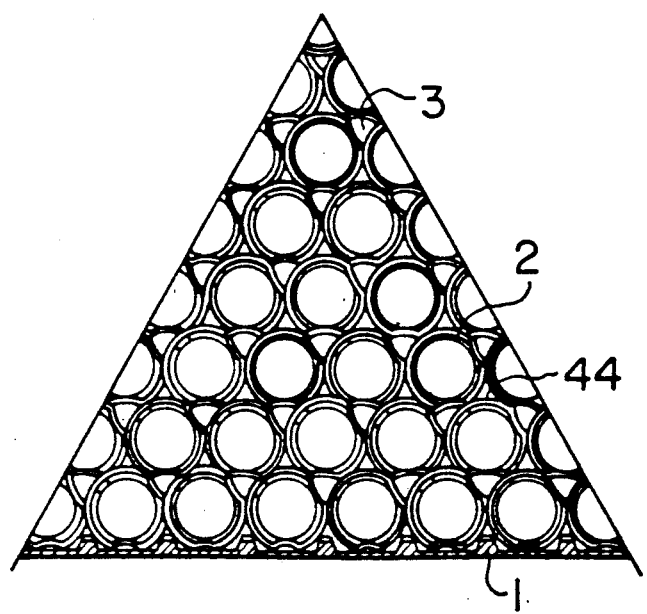

FIGS. 8 to 11 show other embodiments of the present invention, where a material of each of spacers for maintaining a distance between the adjacent cladding tubes 2 is devised, as well as the present invention is applied to a fuel assembly of the fast breeder reactor core constituted by a plurality of fuel assemblies and control rods assembled together as in the first embodiment. FIGS. 8 and 9 show examples that wire spacers are used. In the case where the temperature of the wire spacer is relatively high near the temperature of the cladding tubes 2, as in a third embodiment shown in FIG. 8, wire spacers 41 made of the low temperature peak swelling material such as the cold worked 316SS-Ti are used. On the other hand, in the case where the temperature of the wire spacer is relatively low near the temperature of the duct 1, as in a fourth embodiment shown in FIG. 9, wire spacers 42 made of the high temperature peak swelling material such as the cold worked AISI316 are used. Also with these arrangements, the effect equivalent to that of the first embodiment can be attained, and the BDI can be further reduced in comparison with the first embodiment. FIGS. 10 and 11 show examples that grid spacers are used. In these cases, the construction and effect are substantially the same as the above case where the wire spacers are used. In the case where the temperature of the grid spacer is relatively high near the temperature of the cladding tubes 2, as in a fifth embodiment shown in FIG. 10, grid spacers 43 made of the low temperature peak swelling material such as the cold worked 316SS-Ti are used. On the other hand, in the case where the temperature of the grid spacer is relatively low near the temperature of the duct 1, as in a sixth embodiment shown in FIG. 11, grid spacers 44 made of the high temperature peak swelling material such as the cold worked AISI316 are used.

Figure 12:
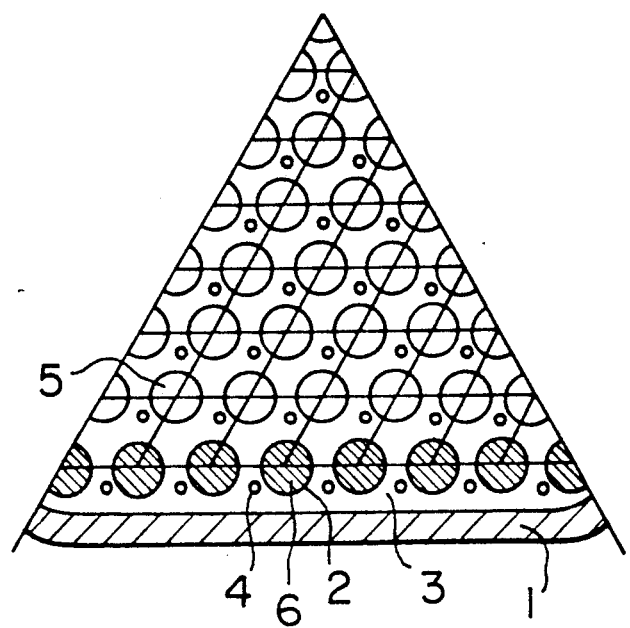
Figure 13:
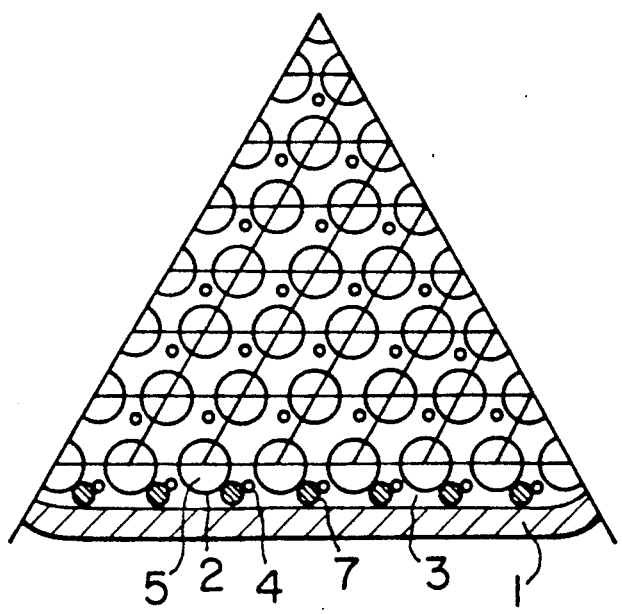

FIGS. 12 and 13 show further embodiment of the present invention, where, although both of the cladding tubes 2 and duct 1 are made of the same low temperature peak swelling material, the temperature of the duct 1 is further increased in comparison with the conventional case, thus reducing the swelling of the duct. In a seventh embodiment shown in FIG. 12, the fuel elements adjacent the duct 1 are constituted by higher enriched fuel material 6 than other fuel elements. With such arrangement, since the temperature of the coolant material flowing coolant paths adjacent the duct 1 is increased, the temperature of the duct is also increased. In a eighth embodiment shown in FIG. 13, hollow or solid coolant refusing bars 7 made of the same material as that of the duct 1 are arranged in the coolant paths adjacent the duct. With such arrangement, a total area of the coolant paths adjacent the duct is decreased to reduce the flow rate of the coolant, thus increasing the temperature of the duct 1. In this way, the irradiation temperature of the duct and the cladding tubes can be adjusted, thereby reducing the swelling of the cladding tubes and the duct even if they are made of the same material.

FIGS. 14 and 15 show a ninth embodiment of the present invention, where a core of the fast breeder reactor is constituted by the fuel assemblies 8 shown in either one of the above-mentioned embodiments and the control rods 9 shown in the second embodiment. Also with this arrangement, the lives of the fuel assemblies and control rods could be prolonged, and, it was found that the continuous operating cycle length of the reactor core could be more extended by about 20% and the availability factor could also be more increased by about 2%, in comparison with the conventional arrangement. Incidentally, in FIGS. 14 and 15, the reference numerals 23 and 24 designate the radial blankets and axial blankets as mentioned above, respectively.

Figure 16:
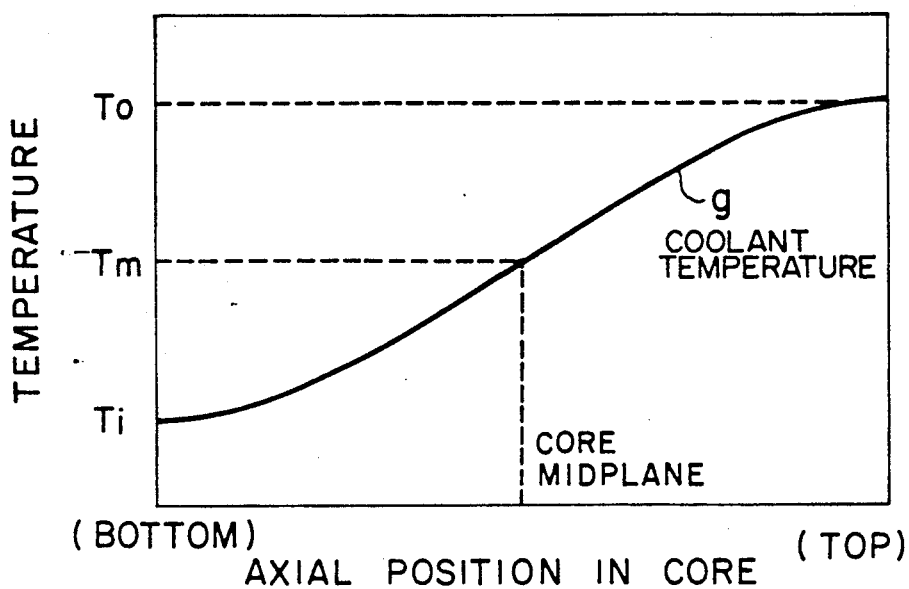
FIG. 16 is a graph showing temperature distribution of a reactor core, for explaining a principle of a method for operating a reactor, according to the present invention.
Figure 17:
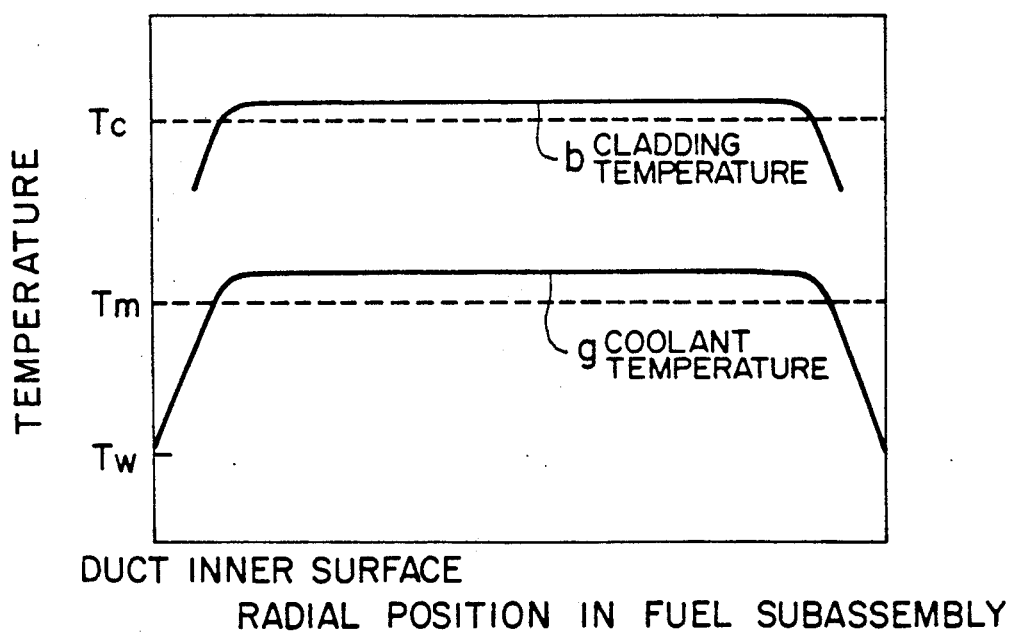
FIG. 17 is a graph showing temperature distribution of a fuel assembly, for explaining the principle of the method for operating a reactor, according to the present invention.

FIGS. 16 and 17 show a tenth embodiment of the present invention. The embodiment regarding a method for operating the reactor according to the present invention will now be explained with reference to these Figures. FIG. 16 is a graph showing distribution feature of the coolant temperature regarding the axial direction of the reactor core, where a curve g shows a coolant temperature. The coolant temperature at the inlet of the reactor is Ti. But, the coolant temperature is being increased while passing through the reactor by cooling the fuel assemblies and the control rods, and is reached to a maximum temperature To at the outlet of the reactor. In the vicinity of the axial center of the reactor core where the fast neutron fluence is high, the coolant temperature substantially equals to arithmetic mean Tm between the above values Ti and To. On the other hand, FIG. 17 shows radial temperature distribution of the fuel assemblies in the vicinity of the axial center of the reactor core. In FIG. 17, a curve b shows the cladding temperature and curve g shows the coolant temperature. That is to say, the average temperature Tc of the cladding tube is higher than the average temperature Tm of the coolant material, and the average temperature Tw of the duct is lower than the average temperature Tm of the coolant material. Accordingly, by selecting a temperature condition so that the average coolant temperature Tm is higher than a temperature at the peak swelling of the material of the cladding tube and is lower than a temperature at the peak swelling of the material of the duct, the swelling of the cladding tubes and ducts can be restrained, thus prolonging the fuel life.

In the above embodiments, while the cold worked 316SS-Ti was used as the low temperature peak swelling material and the cold worked AISI316 was used as the high temperature peak swelling material, other combinations of the materials may be used to obtain the same effect. For example, the cold worked 316 SS including no titanium may be used as the high temperature peak swelling material as well as the cold worked 316SS-Ti is used as the low temperature peak swelling material, or the none cold worked 316SS may be used as the high temperature peak swelling material as well as the cold worked 316SS-Ti is used as the low temperature peak swelling material, or HT-9 ferrite steel may be used as the low temperature peak swelling material and at the same time D-9 austenite steel may be used as the high temperature peak swelling material. Further, in the above embodiments, while the pellet-shaped mixed oxide of uranium and plutonium was used as the fuel material, boron carbide was used as the material for absorbing the neutrons, sodium (Na) was used as the coolant material and the homogeneous reactor core was used as the core configuration, it should be noted that the present invention is applicable to other fuel materials, neutron absorbing materials, coolant materials and/or core configurations. According to the reactor operating method of the present invention, the continuous operating cycle length of the reactor core can be extended and availability factor of the reactor can also be increased.

According to the present invention, since both of the mechanical interactions (BDI and DDI) can be reduced simultaneously, the life of the structural components for constituting the reactor core can be extended, thereby improving the availability factor of the reactor. Further, according to the present invention applied to the control rods, the insertion and withdrawal of the control rods with respect to the reactor core can always be performed smoothly.

What is claimed is:

1. A structural component for constituting a reactor core, comprising:
   one and the other metallic members arranged adjacent to each other in a reactor, and
   reduction means for reducing a difference swelling between said metallic members due to neutron irradiation thereto,
   wherein said one metallic member is at least one of a metallic cladding tube and a tubular member enclosing a plurality of said cladding tubes therein and said other metallic member is a tubular member adjacent said one metallic member and enclosing a plurality of said cladding tubes therein, said reduction means for reducing a difference in swelling between said one and said other metallic members due to neutron irradiation thereto simultaneously enabling reduction of both interaction between said cladding tubes and said tubular member enclosing said cladding tubes therein and interaction between adjacent said tubular members.

2. A structural component for constituting a reactor core, according to claim 1, wherein said reduction means comprise means for relatively reducing the swelling of both of said metallic members.

3. A structural component for constituting a reactor core, according to claim 2, wherein said one metallic member comprises a metallic cladding tube within which substance heated by the neutron irradiation thereto is filled, and said other metallic member comprises a tubular member enclosing a plurality of said cladding tubes therein, and said reduction means are constituted by material of said tubular member having an irradiation temperature where the swelling rate of the material due to the neutron irradiation becomes maximum and that differs from that of material of said cladding tube.

4. A structural component for constituting a reactor core, according to claim 3, wherein said cladding tube is made of such a material that an irradiation temperature where the swelling rate of said material due to the neutron irradiation thereto becomes maximum is lower than said irradiation temperature where the swelling rate of the material of said tubular member due to the neutron irradiation thereto becomes maximum.

5. A structural component for constituting a reactor core, according to claim 3, wherein the material of said cladding tube comprises a steel to which austenite stabilizing elements are added, and the material of said tubular member comprises a steel to which stabilizing elements are not added.

6. A structural component for constituting a reactor core, according to claim 3, wherein the material of said cladding tube comprises ferrite steel, and the material of said tubular member comprises austenite steel.

7. A structural component for constituting a reactor core, according to claim 3, wherein other structure made of material similar to that of either of said cladding tube or said tubular member is arranged between said cladding tube and said tubular member.

8. A structural component for constituting a reactor core, according to claim 1, wherein said one metallic member comprises a metallic cladding tube within which substance heated by the neutron irradiation thereto is filled, and said other metallic member comprises a tubular member enclosing a plurality of said cladding tubes therein, and said reduction means comprise solid or hollow coolant refusing members arranged in coolant flowing paths positioned between said tubular member and said cladding tubes adjacent said tubular member.

9. A structural component for constituting a reactor core, according to claim 8, wherein said cladding tube and said tubular member are made of materials of the same kind.

10. A structural component for constituting a reactor core, according to claim 1, wherein said one metallic member comprises a metallic cladding tube within which nuclear fuel material comprising fissile material and fertile material as substance heated by the neutron irradiation thereto is filled, and said other metallic member comprises a tubular member enclosing a plurality of said cladding tubes therein.

11. A structural component for constituting a reactor core, according to claim 10, wherein said reduction means are constituted by material of said tubular member having an irradiation temperature where the swelling rate of the material due to the neutron irradiation becomes maximum and that differs from that of material of said cladding tube.

12. A structural component for constituting a reactor core, according to claim 10, wherein said reduction means comprise to increase enrichment of the fissile material filled within said cladding tubes adjacent said tubular member more than that of the fissile material filled within said cladding tubes positioned not adjacent said tubular member.

13. A structural component for constituting a reactor core, according to claim 12, wherein said cladding tube and said tubular member are made of materials of the same kind.

14. A structural component for constituting a reactor core, according to claim 1, wherein said one metallic member comprises a metallic cladding tube within which nuclear fission reaction controlling material comprising neutron absorbing material as substance heated by the neutron irradiation thereto is filled, and said other metallic member comprises a tubular member enclosing a plurality of said cladding tubes therein.

15. A structural component for constituting a reactor core, according to claim 14, wherein said reduction means are constituted by material of said tubular member having an irradiation temperature where the swelling rate of the material due to the neutron irradiation becomes maximum and that differs from that of material of said cladding tube.

16. A structural component for constituting a reactor core, according to claim 14, wherein a guide tube made of material having an irradiation temperature where the swelling rate of the material due to the neutron irradiation becomes maximum and that is higher than that of material of said cladding tube is arranged around said tubular member.

17. A core or a reactor, comprising a plurality of said structural component according to any one of claims 1 to 16 at least.

18. A structural component for constituting a reactor core, comprising:
   one and the other metallic members arranged adjacent to each other in a reactor, and
   reduction means for reducing a difference in swelling between said metallic members due to neutron irradiation thereto,
   wherein said one metallic member comprises a metallic cladding tube within which substance heated by the neutron irradiation thereto is filled, and said other metallic member comprises a tubular member enclosing a plurality of said cladding tubes therein, and said reduction means comprise solid or hollow coolant refusing members arranged in coolant flowing paths positioned between said tubular member and said cladding tubes adjacent said tubular member, and
   wherein said solid or hollow refusing members are arranged only adjacent said tubular member so as to decrease a total area of coolant paths adjacent said tubular member and to reduce the flow rate of coolant thereat and thereby provide an increase in temperature of the tubular member.

19. A structural component for constituting a reactor core according to claim 12, wherein said cladding tubes adjacent said tubular member having an increased enrichment of the fissile material with respect to the enrichment of the fissile material filled within said cladding tubes positioned non-adjacent said tubular member so as to enable an increase in temperature of coolant flowing in coolant paths adjacent said tubular member and therewith an increase in the temperature of said tubular member.

20. A structural component for constituting a reactor core according to claim 14, wherein said one metallic member and said other metallic member form a control rod arranged for movement with respect to said reactor core.

* * * * *